(12) United States Patent
Ohashi et al.

(10) Patent No.: US 9,696,436 B2
(45) Date of Patent: Jul. 4, 2017

(54) SCINTILLATOR CRYSTAL AND RADIATION DETECTOR USING THE SAME

(71) Applicant: CANON KABUSHIKI KAISHA, Tokyo (JP)

(72) Inventors: Yoshihiro Ohashi, Tokyo (JP); Nobuhiro Yasui, Yokohama (JP); Toru Den, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/947,728

(22) Filed: Nov. 20, 2015

(65) Prior Publication Data
US 2016/0154123 A1 Jun. 2, 2016

(30) Foreign Application Priority Data
Nov. 28, 2014 (JP) .................. 2014-242448

(51) Int. Cl.
*G01T 1/202* (2006.01)
*G01T 1/20* (2006.01)

(52) U.S. Cl.
CPC .......... *G01T 1/2023* (2013.01); *G01T 1/2008* (2013.01)

(58) Field of Classification Search
CPC .................................................. G01T 1/2023
See application file for complete search history.

(56) References Cited

U.S. PATENT DOCUMENTS

2005/0019241 A1\* 1/2005 Lyons .................... 423/263
2014/0110587 A1\* 4/2014 Ohashi et al. ............ 250/361 R

FOREIGN PATENT DOCUMENTS

JP 2013047334 A 3/2013

\* cited by examiner

*Primary Examiner* — David Porta
*Assistant Examiner* — Hugh H Maupin
(74) *Attorney, Agent, or Firm* — Canon U.S.A. Inc., IP Division

(57) ABSTRACT

A scintillator crystal includes a plurality of first crystal phases, and a second crystal phase covering respective side surfaces of the first crystal phases. Each of the plurality of first crystal phases is a columnar crystal that includes a perovskite type oxide material containing both Gd and Tb, and emits light by being excited by radiation. The second crystal phase includes alumina. Assuming that a, b, and c respectively represent Gd, Al, and Tb in an element ratio among them that are contained in a total amount of substance of the scintillator crystal, the element ratio is within a range defined by (a, b, c)=(0.174, 0.795, 0.031), (0.207, 0.756, 0.037), (0.213, 0.775, 0.012), and (0.194, 0.795, 0.011) as vertexes in a ternary composition diagram.

13 Claims, 10 Drawing Sheets

(Gd, Al, Tb) = (a, b, c) =
A1: (0.174, 0.795, 0.031)
A2: (0.207, 0.756, 0.037)
A3: (0.213, 0.775, 0.012)
A4: (0.194, 0.795, 0.011)
A5: (0.212, 0.770, 0.018)
A6: (0.196, 0.770, 0.034)
A7: (0.189, 0.795, 0.016)
A8: (0.218, 0.770, 0.012)
A9: (0.242, 0.745, 0.013)
A10: (0.235, 0.745, 0.020)
A11: (0.217, 0.745, 0.038)

(Gd, Al, Eu) = (d, e, f) =
B1: (0.189, 0.795, 0.016)
B2: (0.235, 0.745, 0.020)
B3: (0.250, 0.745, 0.005)
B4: (0.201, 0.795, 0.004)
B5: (0.226, 0.770, 0.004)
B6: (0.212, 0.770, 0.018)
B7: (0.219, 0.770, 0.011)
B8: (0.195, 0.795, 0.010)
B9: (0.242, 0.745, 0.013)

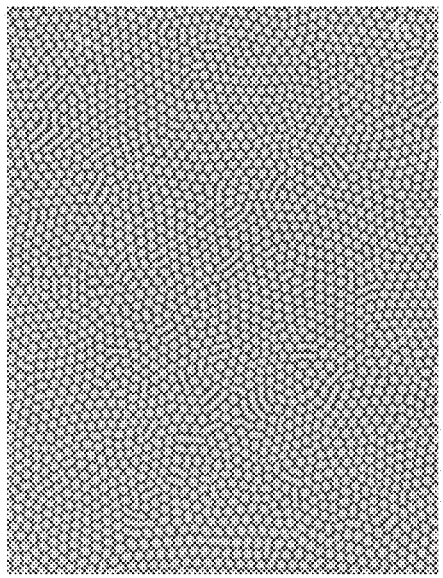
FIG.3B (Gd, Al, Eu) = (0.214, 0.770, 0.016)
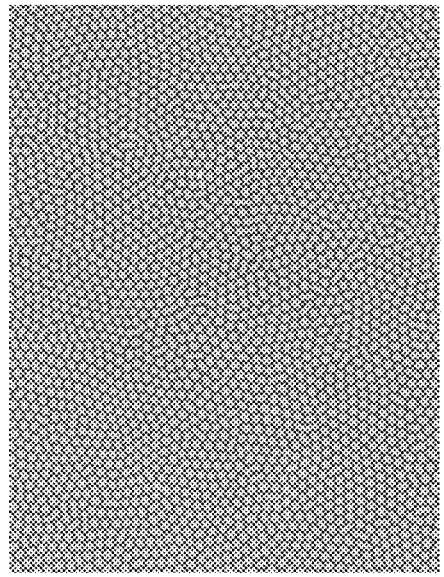
FIG.3A (Gd, Al, Tb) = (0.218, 0.770, 0.012)

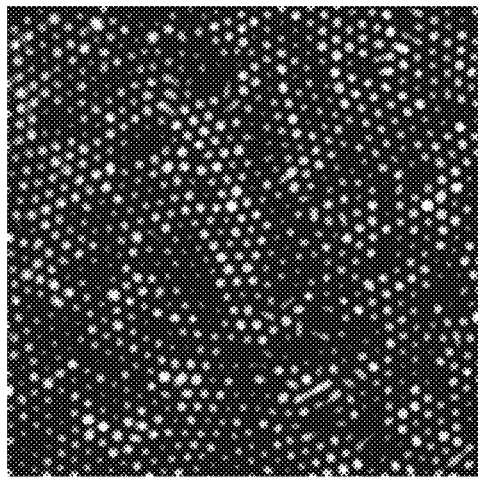
FIG.4B (Gd, Al, Eu) = (0.214, 0.770, 0.016)
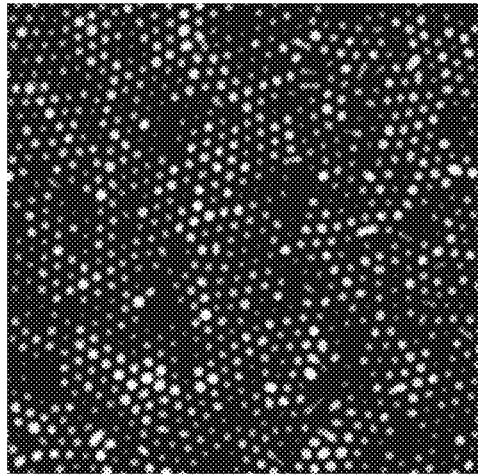
FIG.4A (Gd, Al, Tb) = (0.218, 0.770, 0.012)

(Gd, Al, Tb) = (0.230-c, 0.770, c)

(Gd, Al, Eu) = (0.230-f, 0.770, f)

(Gd, Al, Tb) = (0.230-c, 0.770, c)

(Gd, Al, Eu) = (0.230-f, 0.770, f)

SCINTILLATOR CRYSTAL AND RADIATION DETECTOR USING THE SAME

BACKGROUND OF THE INVENTION

Field of the Invention

The present invention relates to a scintillator crystal and a radiation detector using this scintillator crystal.

Description of the Related Art

X-ray imaging apparatuses for use in the medical field and the like receive an X-ray transmitted through an object by a scintillator, and detect light emitted from this scintillator by a photo detector.

Japanese Patent Application Laid-Open No. 2013-47334 discusses a scintillator crystal having a phase separation structure constituted by a plurality of columnar crystals (cylinder phases) including a perovskite type oxide material containing the Gd element, and a crystal phase (a matrix phase) located around these columnar crystals. Each of the plurality of columnar crystals contains a rare earth element as a light emission center, and emits light by radiation excitation. In the present disclosure, the scintillator crystal having the phase separation structure in this manner may be referred to as a phase separation scintillator crystal.

A refractive index is different for a material forming the cylinder phases as compared to a material forming the matrix phase in this scintillator crystal. Due to this difference, this scintillator crystal is equipped with an optical waveguide function. The scintillator equipped with the optical waveguide function can reduce crosstalk compared to a scintillator unequipped with the optical waveguide function.

SUMMARY OF THE INVENTION

According to an aspect of the present invention, a scintillator crystal includes a plurality of first crystal phases, and a second crystal phase covering respective side surfaces of the first crystal phases. Each of the plurality of first crystal phases is a columnar crystal that includes a perovskite type oxide material containing both Gd and Tb, and emits light by being excited by radiation. The second crystal phase includes alumina. Assuming that a, b, and c respectively represent Gd, Al, and Tb in an element ratio among them that are contained in a total amount of substance of the scintillator crystal, the element ratio is within a range defined by (a, b, c)=(0.174, 0.795, 0.031), (0.207, 0.756, 0.037), (0.213, 0.775, 0.012), and (0.194, 0.795, 0.011) as vertexes in a ternary composition diagram.

Further features of the present invention will become apparent from the following description of exemplary embodiments with reference to the attached drawings.

BRIEF DESCRIPTION OF THE DRAWINGS

FIG. 3A illustrates an image formed by observing the scintillator crystal in Example 1 with use of a scanning electron microscope.

FIG. 3B illustrates an image formed by observing the scintillator crystal in Example 3 with use of the scanning electron microscope.

FIG. 4A illustrates an image formed by observing a cross section of the scintillator crystal in Example 1 as a transmission image by an optical microscope.

FIG. 4B illustrates an image formed by observing a cross section of the scintillator crystal in Example 3 as a transmission image by the optical microscope.

DESCRIPTION OF THE EMBODIMENTS

Figure 1:
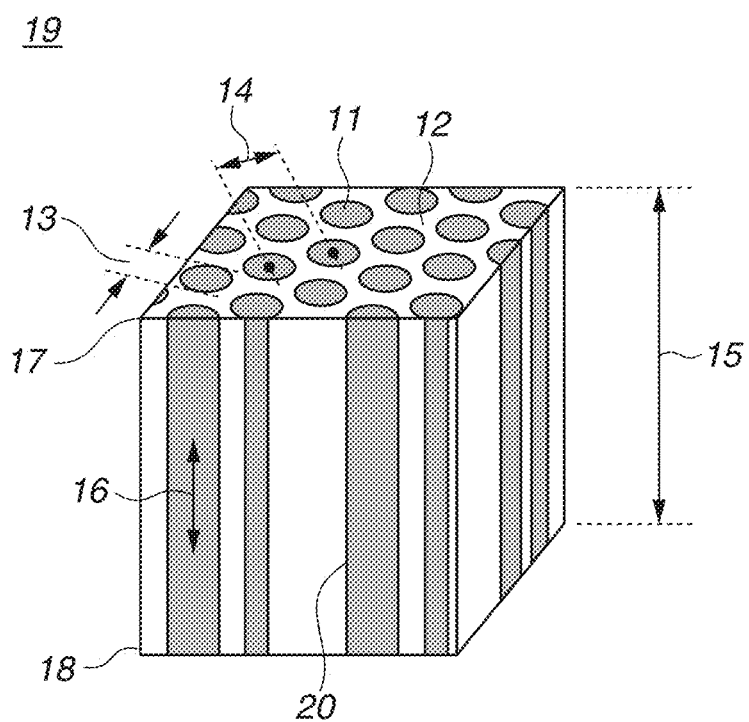
FIG. 1 is a schematic view of a scintillator crystal according to a first exemplary embodiment and a second exemplary embodiment.

Japanese Patent Application Laid-Open No. 2013-47334 discusses that a luminescence intensity (a light yield) can be increased by adjusting a contained amount of the rare earth element. However, in some cases, a range of the rare earth element discussed in Japanese Patent Application Laid-Open No. 2013-47334 may fail to achieve a sufficient luminescence intensity.

Therefore, aspects of the present invention are directed to providing a phase separation scintillator where the phase separation scintillator crystal having the cylinder phases including the perovskite type oxide material containing the Gd element can achieve a higher luminescence intensity than the scintillator crystal discussed in Japanese Patent Application Laid-Open No. 2013-47334. In the following description, exemplary embodiments for embodying aspects of the present invention will be described with reference to the drawings and the like. The present invention can be embodied in various kinds of forms (various configurations and various materials). However, a common feature throughout them is the provision of a plurality of columnar crystals (hereinafter referred to as first crystal phases) and a crystal phase (hereinafter referred to as a second crystal phase) covering respective side surfaces of the plurality of first crystal phases, with the first crystal phases each including the perovskite type oxide material and the second crystal phase including alumina. Further, a material forming each of the first crystal phases has a higher refractive index than a material forming the second crystal phase. Thus, light incident at an angle that satisfies a condition for total reflection on an interface with the second crystal phase having the low refractive index, in light produced in the first crystal phase, which is the phase having the high refractive index, is totally reflected. As a result, the totally reflected light travels while being waveguided through the inside of the first crystal phase. The first crystal phase is a columnar crystal, so that the first crystal phase and the second crystal phase act as a waveguide to guide light in a direction in which the columnar crystal extends. In other words, it can be said that at least a part of the light produced in the scintillator crystal travels in the direction in which the first crystal phase extends while being confined in the first crystal phase without diffusing. Once the light is totally reflected, the light is guided without leaking from the first crystal phase unless there is a structural defect or the column is largely bent.

In the following description, each of the exemplary embodiments will be described. Each of the exemplary embodiments will be described as a thus-configured phase separation scintillator crystal having a composition of the scintillator crystal that can achieve both a high luminescence intensity and a little afterglow.

A first exemplary embodiment will be described as a scintillator crystal having first crystal phases including a perovskite type oxide material containing both Gd and Tb.

[Configuration of Scintillator Crystal]

FIG. 1 illustrates a schematic view of a scintillator crystal 19 according to the present exemplary embodiment.

The scintillator crystal 19 according to the present exemplary embodiment has a phase separation structure including a plurality of first crystal phases 11, and a second crystal phase 12 covering side surfaces 20 of the first crystal phases 11. A shape of a columnar crystal forming each of the first crystal phases 11 may be various kinds of shapes without being limited to a cylindrical shape, and may be, for example, a polygonal shape. Further, it is desirable that a diameter 13 of the first crystal phase 11 is within a range of 300 nm or larger and 30 μm or smaller. More specifically, produced light reaches a photo detector while being reflected on an interface between the first crystal phase 11 and the second crystal phase 12. At this time, if a structural period is shorter than a wavelength of the light, many components of the light end up being transmitted through the interface without being reflected. Therefore, it is desirable that the diameter 13 of the first crystal phase 11 is larger than the wavelength of the produced light. The scintillator according to the present exemplary embodiment may emit light in an ultra-violet region from 300 nm, and this light may be detected by the photo detector. Therefore, it is desirable that the diameter 13 of the first crystal phase 11 is 300 nm or larger. Further, if the diameter 13 of the first crystal phase 11 is larger than one pixel of the photo detector, this leads to a reduction in an effect of confining the light within one pixel. Therefore, it is desirable that an upper limit value of the diameter 13 of the first crystal phase 11 is smaller than a size of one pixel. An arbitrary size can be used as the size of one pixel. In the present exemplary embodiment, a photo detector having a pixel size of 30 μm square may be used in a case where the pixel size is large. Therefore, it is desirable that the diameter 13 of the first crystal phase 11 is 30 μm or smaller. On the other hand, a closest distance 14 between the first crystal phases 11 is determined according to the diameter 13 of the first crystal phase 11. As the closest distance 14 between the first crystal phases 11 increases, a volume occupied by the first crystal phases 11 reduces. On the other hand, an excessively short closest distance 14 results in the adjacent first crystal phases 11 brought into contact with each other, and thus forming a lamella structure without being able to maintain the columnar structure. Therefore, it is desirable to adjust the volume occupied by the first crystal phases 11 to 30% or higher to 60% or lower. In this case, a ratio of the diameter 13 of the first crystal phase 11 to the closest distance 14 between the first crystal phases 11 is approximately 60% or higher to 80% or lower. For example, when the diameter 13 of the first crystal phase 11 is 30 μm, which is the upper limit value, it is desirable that the closest distance 14 between the first crystal phases 11 is approximately 38 μm to 50 μm. On the other hand, when the diameter 13 of the first crystal phase 11 is 300 nm, which is the lower limit value, it is desirable that the closest distance 14 between the first crystal phases 11 is approximately 380 nm to 500 nm. For these reasons, it is desirable that the diameter 13 of the first crystal phase 11 is within the range of 300 nm or larger and 30 μm or smaller, and an average distance of the closest distance 14 of a gap is within a range of 380 nm or longer and 50 μm or shorter.

However, when the scintillator crystal 19 according to the present exemplary embodiment and the detector are used in combination, it is desirable to use, in combination with the scintillator crystal 19, a photo detector having a pixel size that allows the plurality of first crystal phases 11 to be disposed oppositely on a region of a light reception portion of this photo detector. The closest distance 14 between the first crystal phases 11 refers to a distance of a straight line connecting central lines of the adjacent first crystal phases 11 to each other by the most direct way. For example, approximately ten first crystal phases 11 are arranged for each pixel, if the region of the light reception portion is a square having one side of 20 μm in length and the photo detector is used in combination with the scintillator crystal 19 having such a structural size that the diameter 13 of the first crystal phase 11 is 5 μm and the average value of the closest distance 14 between the first crystal phases 11 is 8 μm. In this manner, it is desirable to use, in combination with the photo detector, the scintillator crystal 19 having a smaller structural size than the size of the region of the light reception portion according to the size of the region of the light reception portion. Further, the structural size of the scintillator crystal 19 is determined according to a selection of the materials forming the scintillator crystal 19 and a manufacturing condition, which will be described below. A photo detector array may be used as the photo detector. In the present invention and the present disclosure, the photo detector array is regarded as one type of the photo detector.

Further, depending on a manufacturing method that is used, a thickness 15 of the scintillator crystal 19 can be adjusted to an arbitrary thickness. In particular, it is desirable that the first crystal phase 11 continuously extends along a direction connecting a first surface 17 of the first crystal phase 11 and a second surface 18 of the first crystal phase 11 that is different from the first surface 17 (a direction 16 in which the columnar crystal extends). However, the first crystal phase 11 may be, along the way, discontinuous, branch off, have a portion where a plurality of crystal phases is integrated, and/or have a portion where the diameter 13 of the crystal phase varies. Further, while in FIG. 1 the first surface 17 and the second surface 18 are located opposite from each other, it is not required that they be located opposite from each other. In this case, the light produced at the scintillator crystal 19 is guided through the waveguide to the first surface 17 or the second surface 18. However, the first surface 17 and the second surface 18 are defined to be surfaces on which the plurality of first crystal phases 11 is exposed, and which intersect with two directions in which the first crystal phases 11 are arrayed. In the case where the first surface 17 and the second surface 18 are located opposite from each other, it is desirable that the first crystal phase 11 is continuous in a straight line, but the first crystal phase 11 may include a portion that does not extend in a straight line. The direction in which the first crystal phase 11 extends can be determined by appropriately controlling a direction of a solidification interface, which will be described below.

The scintillator crystal 19, which has the phase separation structure including the plurality of first crystal phases 11 and the second crystal phase 12 separated from each other as illustrated in FIG. 1, is a eutectic of the plurality of crystal phases 11 and the second crystal phase 12. In the present disclosure, the phase separation structure formed of the eutectic will be referred to as a eutectic phase separation structure. To acquire the scintillator crystal 19 having the eutectic phase separation structure, this scintillator crystal can be manufactured by mixing the material of the first crystal phases 11 and the material of the second crystal phase 12 at a composition around a eutectic composition, and carrying out unidirectional solidification. Because a eutectic composition ratio between the perovskite type oxide material and alumina is 46:54 (mol %), it is desirable that a composition ratio between the first crystal phases 11 and the second crystal phase 12 is within a range of ±5 mol % from this eutectic composition ratio. In other words, a range of 41:59 to 51:49 (mol %) is desirable. It should be noted that, in the present disclosure and according to aspects of the present invention, the expression "a range of a certain value to another value" is defined to mean a range including the values placed on the left side and the right side of the preposition "to". In other words, in this case, the desirable range includes 41:59 and 51:49 (mol %).)

As described above, in the present exemplary embodiment, each of the plurality of first crystal phases 11 is the perovskite type oxide material containing both Gd and Tb. Further, the second crystal phase 12 is alumina ($Al_2O_3$). It has been discovered that, assuming that a, b, and c respectively represent Gd, Al, and Tb in an element ratio among them that are contained in a total amount of substance (a total of amounts of substance of the first and second crystal phases 11 and 12) of the scintillator crystal 19, a light yield (LY) value, which is a light emission amount, increases if the element ratio is within a range surrounded by a ternary composition diagram defined by vertexes (a, b, c)=(0.174, 0.795, 0.031), (0.207, 0.756, 0.037), (0.213, 0.775, 0.012), and (0.194, 0.795, 0.011). This composition range is indicated as a range of a shaded region defined by vertexes A1, A2, A3, and A4 in the ternary composition diagram illustrated in FIG. 2A. Further, it has been discovered out that the LY value increases, and an afterglow level, which causes an afterimage, reduces, if the element ratio is within a range surrounded by a ternary composition diagram defined by vertexes (a, b, c)=(0.174, 0.795, 0.031), (0.207, 0.756, 0.037), (0.212, 0.770, 0.018), and (0.189, 0.795, 0.016). This composition range is indicated as a range defined by vertexes A1, A2, A5, and A7 in the ternary composition diagram illustrated in FIG. 2A.

These two ranges are ranges discovered based on new knowledge that, when Tb is added to the scintillator crystal having the eutectic phase separation structure of the perovskite type oxide material containing Gd, and alumina, Tb is selectively incorporated into the phase of the perovskite type oxide material. In other words, in the above-described composition range, the first crystal phases 11 form a perovskite type oxide material in which a Gd site of $GdAlO_3$, which is the perovskite type oxide material, is partially substituted with Tb. The substituted $Tb^{3+}$ functions as the light emission center, and exhibits light emission due to an f-f transition by being irradiated with radiation. A maximum value of the LY value in the above-described composition range is approximately 54,000, and it is considered that 48,000, which is an LY value corresponding to approximately 90% of the maximum LY value, or a larger LY value can be acquired in the above-described composition range (the range surrounded by A1 to A4). In addition, it is considered that the afterglow level after 200 milliseconds falls to 0.5% or lower in the composition range surrounded by A1, A2, A5, and A7. In other words, the above-described composition range is set as a desirable composition range that can achieve the LY value of approximately 48,000 or larger and the afterglow level of 0.5% or lower. The reason why it is considered that the above-described LY value and afterglow level can be acquired in this composition range will be described in detail in Example 1.

Another material other than the above-described material may be added to each of the first crystal phases 11. For example, $Ce^{3+}$ may be added to the first crystal phases 11 by an amount of 0.001 mol % or more to 1.0 mol % or less. Without $Ce^{3+}$ added, the crystal may be colored brown, and the light emission of $Tb^{3+}$ may be absorbed and the light emission amount may reduce by approximately 10% depending on an atmosphere under which the crystal grows. On the other hand, adding $Ce^{3+}$ by a small amount of 0.001 mol % or more can reduce the coloring of the crystal and allow the light emission to be extracted without being reabsorbed, thereby succeeding in preventing the reduction in the light emission amount. In addition, adding $Ce^{3+}$ by the small amount within the above-described range can reduce the afterglow to approximately 0.3% compared to the substitution only with $Tb^{3+}$. However, adding $Ce^{3+}$ by an excessive amount affects the structure of the perovskite type oxide material. In a case of an impurity that is not the perovskite type, $Ce^{3+}$ little affects the crystal structure if the added amount is 1.0 mol % or less, whereby it is desirable that the added amount of $Ce^{3+}$ is 1.0 mol % or less.

Further, a part of Gd may be substituted with another rare earth element (Y, La, Pr, Nd, Pm, Sm, Eu, Dy, Ho, Er, Tm, or Yb) as long as the first crystal phases 11 form the perovskite type oxide material. Even when a part of Gd is substituted, it is considered that the LY value and the afterglow level are only slightly affected as long as the element ratio among Gd, Al, and Tb is within the above-described range. Similarly, Gd or another rare earth element may be added to the second crystal phase 12.

In the case where the perovskite type oxide material with the Gd site of $GdAlO_3$ substituted with Tb is used as the material of the first crystal phases 11, like the present exemplary embodiment, each of the first crystal phases 11 is excited by being irradiated with the radiation, and emits the light. It is desirable that only the first crystal phases 11 having the higher refractive index than the second crystal phase 12 emit the light, but both the first crystal phases 11 and the second crystal phase 12 may emit the light.

Waveguiding the light is one important characteristic regarding the scintillator crystal 19 having the phase separation structure including the unidirectionally extending first crystal phases 11 according to the present exemplary embodiment. According to the present exemplary embodiment, the first crystal phases 11 are the perovskite type oxide material, and have the relatively high refractive index compared to alumina ($Al_2O_3$) forming the second crystal phase 12. With regard to material systems forming the above-described first crystal phases 11 and second crystal phase 12, the refractive indices thereof and a refractive index ratio therebetween (the refractive index of the second crystal phase 12/the refractive index of the first crystal phases 11) are lower than 1.

According to Snell's law, light is refracted between materials having different refractive indices in the following manner. When the light is incident on a medium having a low refractive index from a medium having a high refractive index at a certain angle, the light is totally reflected. When the light is incident at an angle lower than that, the light is reflected and refracted. Therefore, the refractive index ratio established in the scintillator crystal 19 having the phase separation structure according to the present exemplary embodiment means that there is a configuration where the light does not diffuse due to the total reflection occurring when the light is incident on the medium having the low refractive index from the medium having the high refractive index. In other words, it is expected that the light propagated through the inside of the medium having the high refractive index is repeatedly refracted and reflected, and the medium having the high refractive index more highly propagates the light while confining the light therein compared to the medium having the low refractive index. Therefore, it is desirable that the refractive index ratio (=the refractive index of the crystal phase having the low refractive index/the refractive index of the crystal phase having the high refractive index) is lower than 1. Further, it is indicated that, as the refractive index ratio is reduced, the light is increasingly more difficult to diffuse, provided that only the total reflection condition is taken into consideration. Since the first crystal phase 11 shaped as the columnar crystal has the high refractive index, the light produced at the first crystal phase 11 is totally reflected on the interface with the second crystal phase 12, which is the matrix filling the side surface of the columnar crystal, and is propagated through the inside of the column of the first crystal phase 11.

In this manner, the scintillator crystal 19 having the phase separation structure according to the present exemplary embodiment is characterized by having the characteristic of waveguiding light along the direction in which the plurality of unidirectional first crystal phases 11 extends, and that prevents scattering and reflection along a direction perpendicular to this direction in which the plurality of first crystal phases 11 extends. Therefore, optical crosstalk can be reduced without providing a partition wall to a scintillator including a group of single crystals, as is otherwise used in a conventional technique.

[Manufacturing Scintillator Crystal]

As the method for manufacturing the scintillator crystal 19 according to the present exemplary embodiment, the scintillator crystal 19 can be manufactured by any method as long as this method melts and solidifies the desired material systems at the optimum composition unidirectionally. In particular, as will be described below, a temperature gradient of a sample is required to be controlled in such a manner that a solid-liquid interface of the sample becomes flat along a surface perpendicular to a direction in which a heater and/or the sample move(s), and it is desirable that the temperature gradient is controlled to approximately 30° C./mm or greater. However, the temperature gradient may be reduced within a range that does not negatively affect the formation of the phase separation structure of the scintillator crystal 19 in each example according to the present exemplary embodiment, to prevent occurrence of a defect such as a crack due to a thermal stress applied to the crystal in the crystal phase. Further, it is also desirable to reduce or eliminate the occurrence of a defect such as a crack by reheating a portion already formed into the scintillator crystal to the extent that this portion is not molten. Further, the composition range that can form the eutectic system having the phase separation structure of the scintillator crystal 19 according to the present exemplary embodiment is ±5 mol % from the eutectic composition, as described above. A correlational relationship specific to the material systems is established among this composition range, the temperature gradient, and a solidification velocity that will be described below, and it is desirable that the scintillator crystal 19 according to the present exemplary embodiment is manufactured within a range called a coupled eutectic zone.

For example, the scintillator crystal 19 can be manufactured by a method that grows a crystal from molten liquid, like the Czochralski method. Further, the scintillator crystal 19 can be also manufactured by the floating zone method. The Bridgman method requires the solidification velocity to be set in such a manner that the solid-liquid interface of the sample becomes a plane as flat as possible along the surface perpendicular to the direction in which the heater and/or the sample move(s), but heat is exchanged between the sample and the outside mainly through a side surface of the sample during the solidification. Therefore, the solidification velocity depends on a diameter of the sample. More specifically, a large diameter of the sample leads to an increase in a time taken for the above-described heat exchange, and thus the solid-liquid interface ends up being considerably curved and the columnar crystals that are the first crystal phases 11 end up being formed unidirectionally nonlinearly in a most region of the sample unless the solidification velocity is slowed down in this case. This is because a direction in which the columnar crystals grow is substantially perpendicular to the solid-liquid interface. Further, a higher solidification velocity with respect to the size of the sample leads to a failure to keep the solid-liquid interface not only flat but also smooth. This results in such a situation that microscopic roughness is caused along the direction in which the heater and/or the sample move(s), which is accompanied by generation of a dendrite. Therefore, it is important to also avoid such a problem. Accordingly, it is desirable to set the sufficient temperature gradient of the solid-liquid interface, and at the same time, carry out the solidification at a solidification velocity of 850 mm/h or lower.

Further, it is generally considered that the diameter 13 of the first crystal phase 11 of the scintillator crystal 19 and the average value of the period of the closest distance 14 between the first crystal phases 11 depend on the solidification velocity, and, in particular, the period of the closest distance 14 has a correlation with the solidification velocity that is indicated by the following expression; $\lambda^2 \cdot v =$ a constant value, assuming that $\lambda$ and v represent the period and the solidification velocity, respectively. Therefore, the period of the closest distance 14 and the solidification velocity are in such a relationship that setting a desired period inevitably imposes a limitation on the solidification velocity. However, taking into consideration the solidification velocity that allows the solid-liquid interface to be controlled to a flat and smooth plane as the limitation derived from the manufacturing method as described above, the range of the average value of the period $\lambda$ is set to the range of 380 nm or longer and 50 μm or shorter. Further, according thereto, the diameter 13 of the first crystal phase 11 is set within the range of 300 nm or larger and 30 μm or smaller. Then, the diameter 13 of the first crystal phase 11 is intended to also include a dimension in a case where the first crystal phase 11 is not circular, which means that, for example, if the first crystal phase 11 has an irregular shape, a smallest diameter thereof falls within the above-described range. Further, it is desirable that an average ratio calculated from ratios between a largest diameter and a smallest diameter with respect to a large number of the first crystal phases 11 is 10 or lower. If the average ratio is higher than 10, it is appropriate to use a lamella structure as such a structure. However, even if the ratios of some of the plurality of first crystal phases 11 have values higher than 10, this case can be regarded as being within an acceptable range as long as the average ratio is 10 or lower. Further, as the composition ratio between the material systems of the two phases approaches 1:1 in terms of moles, the resultant structure is more likely formed as the lamella structure due to the manufacturing condition, so that it is desirable to select a manufacturing condition and an additive material so as to prevent the formation of the lamella structure.

Next, a feed composition between raw materials of the sample will be described. As described above, ±5 mol % from 46:54 (mol %) is set as the composition ratio between the perovskite type oxide material and alumina in the scintillator crystal 19 according to the present exemplary embodiment. However, the feed composition may be outside this range. This is because unidirectionally solidifying the entire sample from a molten state results in deposition of a substance deviating from the eutectic composition before deposition of other substances at an early stage of the growth, as a result of which remaining molten liquid achieves the eutectic composition. Therefore, it is also desirable to grow the substance deviating from the eutectic composition at the early stage of the growth, and grow this substance again after the molten liquid has the eutectic composition. An intended product can be acquired by cutting off an unnecessary portion after the scintillator crystal 19 is manufactured.

The composition of the scintillator crystal 19 can be measured by, for example, analyzing the composition in a range of 100 μm×100 μm with use of a scanning electron microscope (SEM). Therefore, even if the feed composition is outside the above-described range, the desired LY value and afterglow level can be acquired as long as the composition of the scintillator crystal 19 itself is within the above-described range.

[Application of Scintillator Crystal]

The scintillator crystal 19 having the phase separation structure according to the present exemplary embodiment can be used as a radiation detector for medical care, industrial use, high-energy physics, and space application by being combined with the photo detector. In particular, since the scintillator crystal 19 according to the present exemplary embodiment has the optical waveguide function even without the partition wall provided thereto, it is desirable to use the scintillator crystal 19 according to the present exemplary embodiment under such a situation that light should be guided through the waveguide toward the photo detector in a specific direction. Further, it is also effective to use the scintillator crystal 19 according to the present exemplary embodiment for an X-ray computerized tomography (CT) apparatus that requires the formation of the partition wall, or as a substitute for a CsI needle crystal in an X-ray flat panel detector (FPD). In this case, it is also possible to adjust the wavelength of the light emission of the scintillator crystal 19 so that the wavelength conforms to a light reception sensitivity characteristic of the photo detector, by adding another material or adding a substance capable of serving the light emission center to the light emission phases.

The scintillator crystal 19 is disposed in such a manner that the first surface 17 or the second surface 18 (i.e., the surface on which the plurality of first crystal phases 11 is exposed, and which intersects with the two directions in which the first crystal phases 11 are arrayed) is located opposite from the photo detector. At this time, the scintillator crystal 19 is disposed in such a manner that the plurality of first crystal phases 11 is located generally perpendicularly opposite from the photo detector, if the first surface 17 and the second surface 18 are surfaces opposite from each other. Further, it is desirable that a film or a layer having a function such as a protective layer and antireflection is provided between the photo detector and the scintillator crystal 19 according to the present exemplary embodiment, and the photo detector and the scintillator crystal 19 according to the present exemplary embodiment are joined or disposed via this film or layer.

A second exemplary embodiment of the present invention will be described as a scintillator crystal having first crystal phases including a perovskite type oxide material containing both Gd and Eu.

The present exemplary embodiment is different from the first exemplary embodiment in terms that a part of the Gd site of the first crystal phases is not substituted with Tb but substituted with Eu, but is similar to the first exemplary embodiment in terms of the other features. Therefore, only differences from the first exemplary embodiment will be described.

Further, the first crystal phases according to the present exemplary embodiment are the perovskite type oxide material containing both Gd and Eu. Further, a second crystal phase is alumina, similarly to the first exemplary embodiment. In addition, assuming that d, e, and f respectively represent Gd, Al, and Eu in an element ratio among them that are contained in a total amount of substance (a total of amounts of substance of the first and second crystal phases) of the scintillator crystal, this value is within a range surrounded by a ternary composition diagram defined by vertexes (d, e, f)=(0.189, 0.795, 0.016), (0.235, 0.745, 0.020), (0.250, 0.745, 0.005), and (0.201, 0.795, 0.004). This composition range is indicated as a range of a shaded region defined by vertexes B1, B2, B3, and B4 in a ternary composition diagram illustrated in FIG. 2B.

Further, it has been found out that the LY value increases, and the afterglow level, which cause an afterimage, is reduced, if the element ratio is within a range surrounded by a ternary composition diagram defined by vertexes (d, e, f)=(0.189, 0.795, 0.016), (0.195, 0.795, 0.010), (0.235, 0.745, 0.020), and (0.242, 0.745, 0.013). This composition range is indicated as a range defined by vertexes B1, B2, B8, and B9 in the ternary composition diagram illustrated in FIG. 2B.

These ranges are ranges discovered based on new knowledge that, when Eu is added to the scintillator crystal having the eutectic phase separation structure of the perovskite type oxide material containing Gd, and alumina, Eu is selectively incorporated into the phase of the perovskite type oxide material. In other words, in the above-described composition range, the first crystal phases form a perovskite type oxide material in which the Gd site of $GdAlO_3$, which is the perovskite type oxide material, is substituted with Eu. In this case, the substituted $Eu^{3+}$ functions as the light emission center, and exhibits light emission due to the f-f transition by being irradiated with radiation. Especially in the present exemplary embodiment, it has been found out that the above-described composition range achieves an optimum range that can increase the light yield value, which is the amount of light emitted by the radiation irradiation, and reduce the afterglow level, which causes an afterimage.

A maximum value of the LY value in the composition range defined by the vertexes B1 to B4 is approximately 43,000, and it is considered that 38,500, which is an LY value corresponding to approximately 90% of the maximum LY value, or a larger LY value can be acquired in this composition range. On the other hand, regarding the afterglow, it is considered that the afterglow level after 200 milliseconds falls to 0.5% or lower in the composition range defined by the vertexes B1, B2, B8, and B9. A reason why it is considered that the above-described LY value and afterglow level can be acquired in this composition range will be described in detail in Example 3.

Similarly to the first exemplary embodiment, it is desirable that $Ce^{3+}$ is added to the first crystal phases by the amount of 0.001 mol % or more to 1.0 mol % or less, since this addition can reduce the decrease in the light emission amount due to the coloring of the crystal, and can further reduce the afterglow level.

Further, similarly to the first exemplary embodiment, a part of Gd may be substituted with another rare earth element as long as the first crystal phases form the perovskite type oxide material, and a rare earth element may be added to the second crystal phase.

Example 1 will be described as a more specific example of the first exemplary embodiment.

Figure 2A:
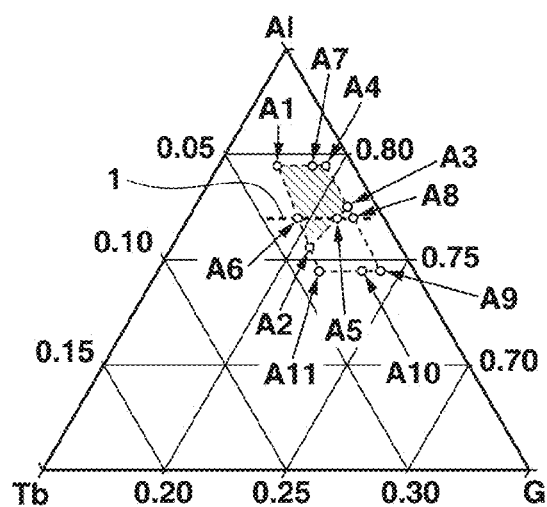
FIG. 2A illustrates an element ratio among Gd, Al, and Tb according to the first exemplary embodiment, or an element ratio among Gd, Al, and Eu according to the second exemplary embodiment as a ternary composition diagram.

The present example will be described, presenting a result of examining compositions on a dotted line 1 illustrated in FIG. 2A. The dotted line 1 indicates compositions in which the composition ratio between the perovskite type oxide material and alumina is 46:54 (mol %). In other words, the compositions of the scintillator crystal 19 on the dotted line 1 can be expressed as a general formula $[Gd_{1-x}Tb_xAlO_3]_{0.46}[Al_2O_3]_{0.54}$, assuming that $0<x<1$. Especially focusing on the quantities of Gd, Al, and Tb in the element ratio among them with a, b, and c (a+b+c=1) assumed to represent the respective quantities in the element ratio, a sum of Gd and Tb is kept constant since the Gd site is selectively substituted with Tb as described above. When the composition ratio between the perovskite type oxide material and alumina is the perovskite type oxide material:alumina=46:54 (mol %), the sum of Gd and Tb is a+c=0.23, while Al is b=0.77. Therefore, the respective quantities in the ratio can be expressed as (Gd, Al, Tb)=(0.230−c, 0.770, c).

Therefore, first, powder of $Gd_2O_3$, powder of $Al_2O_3$, and powder of $Tb_4O_7$ were weighed so as to achieve (a, b, c)=(0.229, 0.770, 0.001), (0.227, 0.770, 0.003), (0.225, 0.770, 0.005), (0.220, 0.770, 0.010), (0.218, 0.770, 0.012), (0.212, 0.770, 0.018), (0.203, 0.770, 0.027), (0.196, 0.770, 0.034), and (0.184, 0.770, 0.046), and were sufficiently mixed together. The thus-prepared powder was put in an iridium (Ir) crucible, and the crucible was heated by induction heating to 1700° C. After the entire sample was molten, the sample was held for 30 minutes, and then was grown at a velocity of 36 mm/h. The scintillator crystal manufactured in this way was cut so as to have a thickness of 1 mm. Then, a surface of the sample at the element ratio (a, b, c)=(0.218, 0.770, 0.012) that extended perpendicularly to the solidification direction was observed with use of the scanning electron microscope (SEM) and an optical microscope, and an emission spectrum thereof by X-ray excitation was evaluated.

FIG. 3A illustrates a result of observing a structure of a cross section along the growth direction with use of the SEM. According to a composition analysis with use of the SEM, the resultant sample was structured in such a manner that the perovskite type oxide material containing both Gd and Tb formed the phases of the columnar crystals (the first phases), and the plurality of columnar crystals formed in this manner was embedded in the matrix phase of $Al_2O_3$ (the second phase). The average value of the structural period of the cylinder was approximately 1.15 µm, and the average value of the diameter 13 was approximately 830 nm. A refractive index n of the material of the first crystal phases 11 (the perovskite type oxide material containing both Gd and Tb) was 2.05, and a refractive index n of the material of the second crystal phase 12 ($Al_2O_3$) was 1.75.

FIG. 4A illustrates a transmission image of the surface perpendicular to the solidification direction that was acquired by the optical microscope. Since the light is wave through the cylinder phases having the high refractive index, the cylinder phases exhibited an optical waveguide characteristic like an optical fiber. Therefore, the cylinder side was observed as a bright spot, and the anisotropy of the light propagation was able to be confirmed.

Figure 5A:
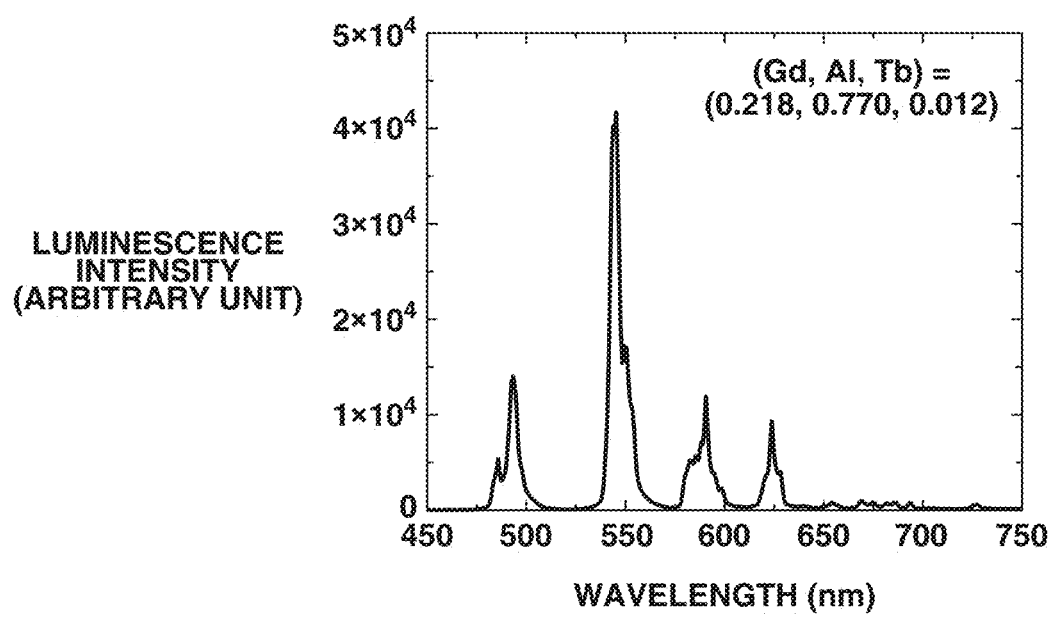
FIG. 5A illustrates an emission spectrum of the scintillator crystal excited by an X-ray in Example 1 and Example 3.

FIG. 5A illustrates the emission spectrum by the X-ray excitation. The first crystal phases 11 forming the cylinders exhibited a sharp peak of green light emission from $Tb^{3+}$ functioning as the light emission center due to the f-f transition, and it was able to be confirmed that the resultant sample functioned as the scintillator. On the other hand, no light emission from $Al_2O_3$ as the second crystal phase 12 was observed. Light emitted so as to satisfy a critical angle for the total reflection, in the light produced at the first crystal phases 11, is guided through the insides of the cylinders. On the other hand, light leaked to the matrix side without being totally reflected in the cylinders turns into light diffusing in the crystals while being refracted.

Figure 6A:
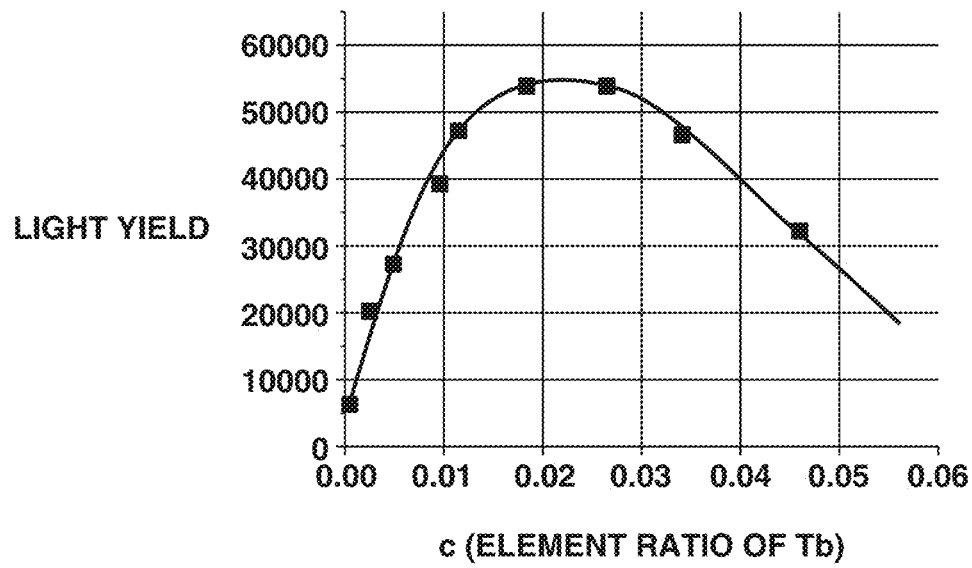
FIG. 6A illustrates a relationship between the quantity of Tb in the ratio and a light emission amount of the scintillator crystal in Example 1.

FIG. 6A illustrates a relationship between the quantity c of Tb in the ratio and the light yield (LY) value. The LY is a value indicating an absolute value of a light emission amount expressed by the number of photons (photons/MeV) of light produced when one photon of radiation at 1 MeV is incident on the scintillator. The LY was measured by detecting a total light amount produced with use of a gamma ray of 662 keV from cesium 137 with use of a photomultiplier tube. Among the above-described nine samples, when the quantity c of Tb in the element ratio was c=0.018 or c=0.027, the light emission amount was maximized and the LY value thereof was approximately 54,000. Assuming that the desirable composition range of the scintillator is the composition range that achieves LY=48,000, which is approximately 90% of the maximum LY value, or a larger LY, a range of c=0.012 to 0.034 is a desirable range.

Figure 7A:
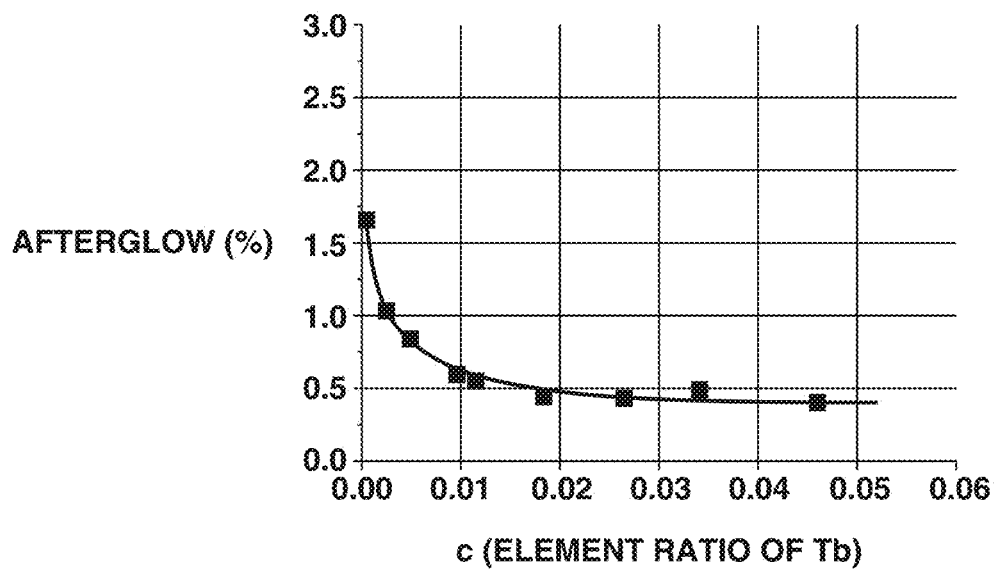
FIG. 7A illustrates a relationship between the quantity of Tb in the ratio and an afterglow of the scintillator crystal in Example 1.

In addition, it is desirable that the afterglow of the scintillator is little. FIG. 7A illustrates a relationship between the quantity c of Tb in the element ratio and a value of the afterglow level after 200 milliseconds. The afterglow reduced as the quantity c of Tb in the element ratio increased, and the afterglow level fell to 0.5% or lower when the quantity c of Tb in the element ratio increased to c=0.018 or higher.

This result has revealed that, when the sum of Gd and Tb and the quantity of Al in the element ratio are a+c=0.23 and b=0.77, respectively, the LY value can reach approximately 48,000 or larger if the quantity of Tb in the element ratio is $0.012 \le c \le 0.034$. The element ratio (a, b, c) among Gd, Al, and Tb in this case is a composition within a range from A8:(0.218, 0.770, 0.012) to A6:(0.196, 0.770, 0.034) illustrated in FIG. 2A. Further, $0.018 \le c \le 0.034$ is desirable, because this range enables the LY value to reach approximately 48,000 or larger and the afterglow level to fall to 0.5% or lower, which satisfies both the large light emission amount and the little afterglow. The element ratio (a, b, c) among Gd, Al, and Tb in this case is a composition within a range from A5:(0.212, 0.770, 0.018) to A6:(0.196, 0.770, 0.034) illustrated in FIG. 2A.

In this manner, it was able to be confirmed that it was possible to acquire the phase separation scintillator crystal capable of satisfying both the large light emission amount and the little afterglow, with use of the perovskite type oxide material containing both Gd and Tb as the first crystal phases 11 and alumina ($Al_2O_3$) as the second crystal phase 12.

As described above, the composition ratio between the perovskite type oxide material and alumina may be another ratio as long as this ratio is within the range of ±5 mol % from 46:54. It is considered that an LY value similar to that of the sample having the composition within A6 to A8 can be acquired, as long as the composition ratio between the perovskite type oxide material and alumina is within this range, and the ratio between the perovskite type oxide material and Tb is (0.23−0.012):0.012 to (0.23−0.034):0.034. Further, it is considered that an LY value and an afterglow level similar to those of the sample having the composition within A5 to A6 can be acquired, as long as the ratio between the perovskite type oxide material and Tb is (0.23−0.018):0.018 to (0.23−0.034):0.034.

If the composition ratio between the perovskite type oxide material and alumina is 41:59 (mol %), the sum of Gd and Tb is a+c=0.205, while Al is b=0.795. Therefore, the respective quantities in the ratio can be expressed as (Gd, Al, Tb)=(0.205−c, 0.795, c). If the sum of Gd and Tb is a+c=0.205 while the ratio therebetween is a c=(0.23−0.012): 0.012, the quantities of Gd and Tb are a=0.194 and c=0.011, respectively. On the other hand, if the sum of Gd and Tb is a+c=0.205 while the ratio therebetween is a:c=(0.23−0.034): 0.034, the quantities of Gd and Tb are a=0.174 and c=0.031, respectively. The element ratio (a, b, c) among Gd, Al, and Tb in this case is a composition within a range from A1:(0.174, 0.795, 0.031) to A4:(0.194, 0.795, 0.011) illustrated in FIG. 2A, and it is considered that an LY value similar to that in A6 to A8 can be acquired in this range. On the other hand, if the ratio between Gd and Tb is a:c=(0.23−0.018):0.018, the quantities of Gd and Tb are a=0.189 and c=0.016, respectively, and it is considered that an LY value and an afterglow level similar to those in A6 to A5 can be acquired in a composition range from A1:(0.174, 0.795, 0.031) to A7:(0.189, 0.795, 0.016).

If the composition ratio between the perovskite type oxide material and alumina is 51:49 (mol %), the sum of Gd and Tb is a+c=0.255, while Al is b=0.745. If the sum of Gd and Tb is a+c=0.255 while the ratio therebetween is a c=(0.23−0.012):0.012, the quantities of Gd and Tb are a=0.242 and c=0.013, respectively. On the other hand, if the sum of Gd and Tb is a+c=0.255 while the ratio therebetween is a:c= (0.23−0.034):0.034, the quantities of Gd and Tb are a=0.217 and c=0.038, respectively. The element ratio (a, b, c) among Gd, Al, and Tb in this case is a composition within a range from A11:(0.217, 0.745, 0.038) to A9:(0.242, 0.745, 0.013) illustrated in FIG. 2A, and it is considered that an LY value similar to that in A6 to A8 can be acquired in this range. On the other hand, if the ratio between Gd and Tb is a:c=(0.23−0.018):0.018, the quantities of Gd and Tb are a=0.235 and c=0.020, respectively, and it is considered that an LY value and an afterglow level similar to those in A6 to A8 can be acquired in a composition range from A11:(0.217, 0.745, 0.038) to A10:(0.235, 0.745, 0.020).

From the above-described analysis, it is considered that an LY value similar to that in A6 to A8 can be acquired if the element ratio among Gd, Al, and Tb is within the range surrounded by the above-described four vertexes A1, A2, A3, and A4. Further, it is further desirable that the element ratio among Gd, Al, and Tb is within the range surrounded by the above-described four vertexes A1, A2, A5, and A7, because it is considered that an LY value and an afterglow level similar to those in A6 to A5 can be acquired in this case.

The inside of the range surrounded in the ternary composition diagram is defined to also include a composition located on the boundary line, and is defined in such a manner that, for example, A5 is regarded as being within the range surrounded by A1 to A4 as the vertexes.

Example 2 will be described as a more specific example of the first exemplary embodiment. The present example is different from Example 1 in terms that this example includes adding not only Tb but also Ce to the first crystal phases 11.

First, powder of $Gd_2O_3$, powder of $Al_2O_3$, powder of $Tb_4O_7$, and powder of $CeO_2$ were each weighed in such a manner that $Ce^{3+}$ was contained at a concentration of 0.01 mol % or 0.2 mol % with respect to the first crystal phases 11 at the composition of the element ratio among Gd, Al, and Tb that was set to (a, b, c)=(0.218, 0.770, 0.012), and were sufficiently mixed together. Further, a raw material without $Ce^{3+}$ added therein was also prepared for a comparison purpose. The thus-prepared powder was placed in the Ir crucible, and the crucible was heated by induction heating to 1700° C. After the entire sample was molten, the sample was held for 30 minutes, and then was grown at the velocity of 36 mm/h. The scintillator crystal 19 manufactured in this way was cut so as to have the thickness of 1 mm, and light emission by X-ray excitation was evaluated.

Figure 8:
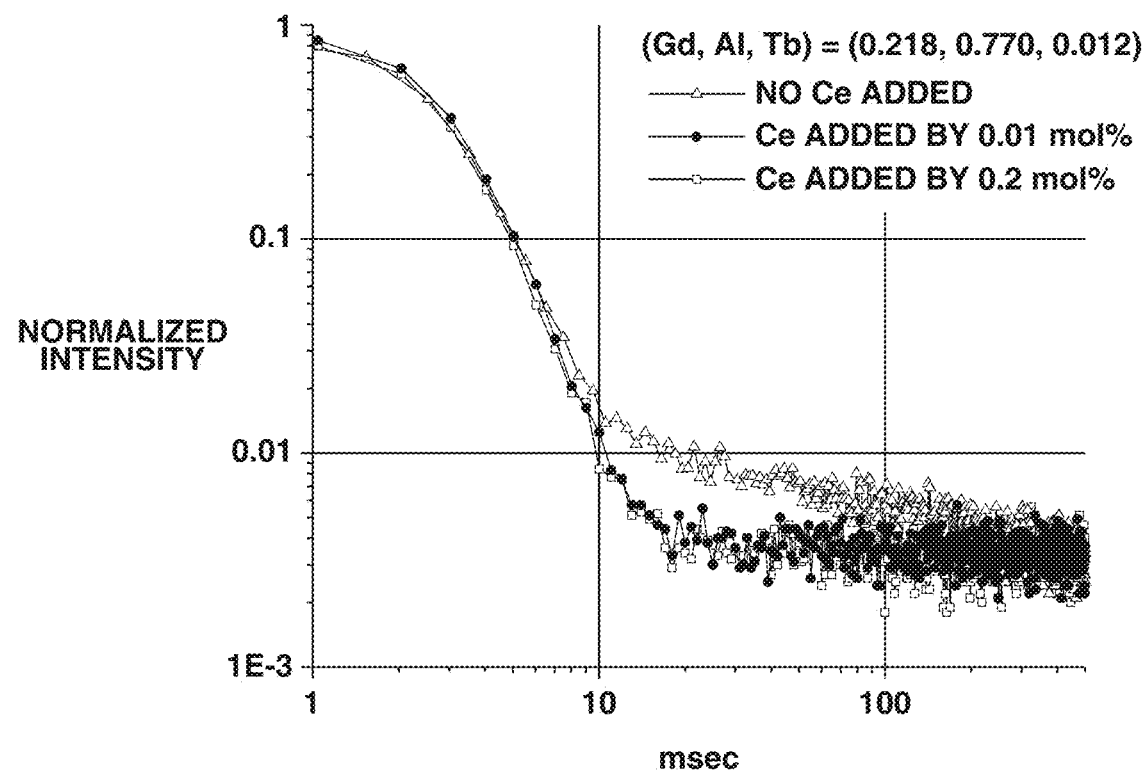
FIG. 8 illustrates an afterglow of the scintillator crystal in Example 2.

FIG. 8 illustrates afterglows of the manufactured samples. The afterglow of the sample without $Ce^{3+}$ added therein after 200 milliseconds was 0.45%. On the other hand, the afterglow was reduced due to the addition of $Ce^{3+}$, and the afterglow after 200 milliseconds fell to 0.3% at the samples with $Ce^{3+}$ added in such a manner that $Ce^{3+}$ was contained at the concentrations of 0.01 mol % and 0.2 mol % with respect to the first crystal phases 11, respectively. In this manner, the afterglow can be reduced by co-doping a small amount of $Ce^{3+}$ as a second element of the light emission center. Such an effect of reducing the afterglow was able to be acquired when $Ce^{3+}$ was added by an added amount within the range of 0.001 mol % to 1.0 mol %.

Further, the sample with the small amount of $Ce^{3+}$ added therein allowed the sample to be manufactured with the crystal therein uncolored, thereby succeeding in preventing the reduction in the light emission amount due to the re-absorption of the light produced in the scintillator crystal 19. In this manner, adding $Ce^{3+}$ contributes to not only reducing the afterglow but also preventing the reduction in the light emission amount due to the coloring of the crystal.

From this result, it has been confirmed that the phase separation scintillator crystal using the perovskite type oxide material containing both Gd and Tb with $Ce^{3+}$ added therein as the first crystal phases 11 and using alumina ($Al_2O_3$) as the second crystal phase 12 can achieve the large light emission amount and the low afterglow level.

Example 3 will be described as a more specific example of the second exemplary embodiment.

Figure 2B:
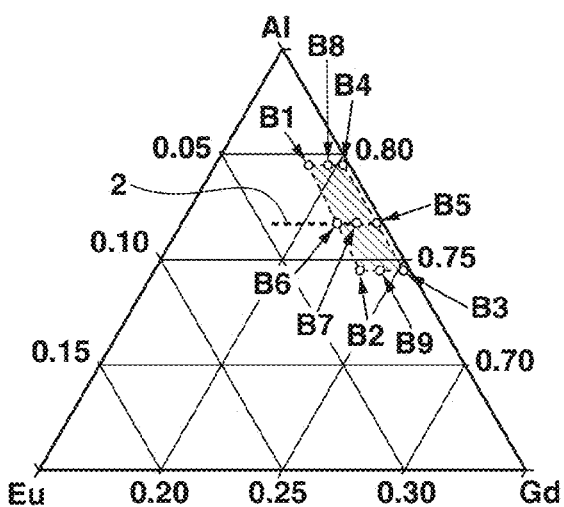
FIG. 2B illustrates an element ratio among Gd, Al, and Eu according to the second exemplary embodiment as a ternary composition diagram.

The present example will be described, presenting a result of examining compositions on a dotted line 2 illustrated in FIG. 2B. The dotted line 2 indicates compositions in which the composition ratio between the perovskite type oxide material and alumina is 46:54 (mol %). In other words, the compositions of the scintillator crystal 19 on the dotted line 2 can be expressed as a general formula $[Gd_{1-y}Eu_yAlO_3]_{0.46}$ $[Al_2O_3]_{0.54}$, assuming that 0<y<1. Especially focusing on the quantities of Gd, Al, and Eu in the element ratio among them with d, e, and f (d+e+f=1) assumed to represent the respective quantities in the element ratio, a sum of Gd and Eu is kept constant since the Gd site is selectively substituted with Eu as described above. When the composition ratio between the perovskite type oxide material and alumina is the perovskite type oxide material:alumina=46:54 (mol %), the sum of Gd and Eu is d+f=0.23, while Al is e=0.77. Therefore, the respective quantities in the ratio can be expressed as (Gd, Al, Eu)=(0.230−f, 0.770, f).

Therefore, first, powder of $Gd_2O_3$, powder of $Al_2O_3$, and powder of $Eu_2O_3$ were weighed so as to achieve (d, e, f)=(0.228, 0.770, 0.002), (0.226, 0.770, 0.004), (0.225, 0.770, 0.005), (0.223, 0.770, 0.007), (0.221, 0.770, 0.009), (0.219, 0.770, 0.011), (0.214, 0.770, 0.016), (0.207, 0.770, 0.023), and (0.184, 0.770, 0.046), and were sufficiently mixed together. The thus-prepared powder was put in the Ir crucible, and the crucible was heated by induction heating to 1700° C. After the entire sample was molten, the sample was held for 30 minutes, and then was grown at the velocity of 36 mm/h. The scintillator crystal 19 manufactured in this way was cut so as to have the thickness of 1 mm. Then, a surface of the sample at the element ratio (d, e, f)=(0.214, 0.770, 0.016) that extended perpendicularly to the solidification direction was observed with use of the scanning electron microscope (SEM) and the optical microscope, and an emission spectrum thereof by X-ray excitation was evaluated.

FIG. 3B illustrates a result of observing a structure of a cross section along the growth direction with use of the SEM. According to a composition analysis with use of the SEM, the resultant sample was structured in such a manner that the perovskite type oxide material containing both Gd and Eu formed the phases of the columnar crystals (the first phases), and the plurality of columnar crystals formed in this manner was embedded in the matrix phase of $Al_2O_3$ (the second phase). The average value of the structural period of the cylinder was approximately 1.16 μm, and the average value of the diameter was approximately 835 nm. A refractive index n of the material of the first crystal phases (the perovskite type oxide material containing both Gd and Eu) was 2.05, and a refractive index n of the material of the second crystal phase ($Al_2O_3$) was 1.75.

FIG. 4B illustrates a transmission image of the surface perpendicular to the solidification direction that was acquired by the optical microscope. Since the light is guided through the cylinder phases having the high refractive index, the cylinder phases exhibited the optical waveguide characteristic like an optical fiber. Therefore, the cylinder side was observed as a bright spot, and the anisotropy of the light propagation was able to be confirmed.

Figure 5B:
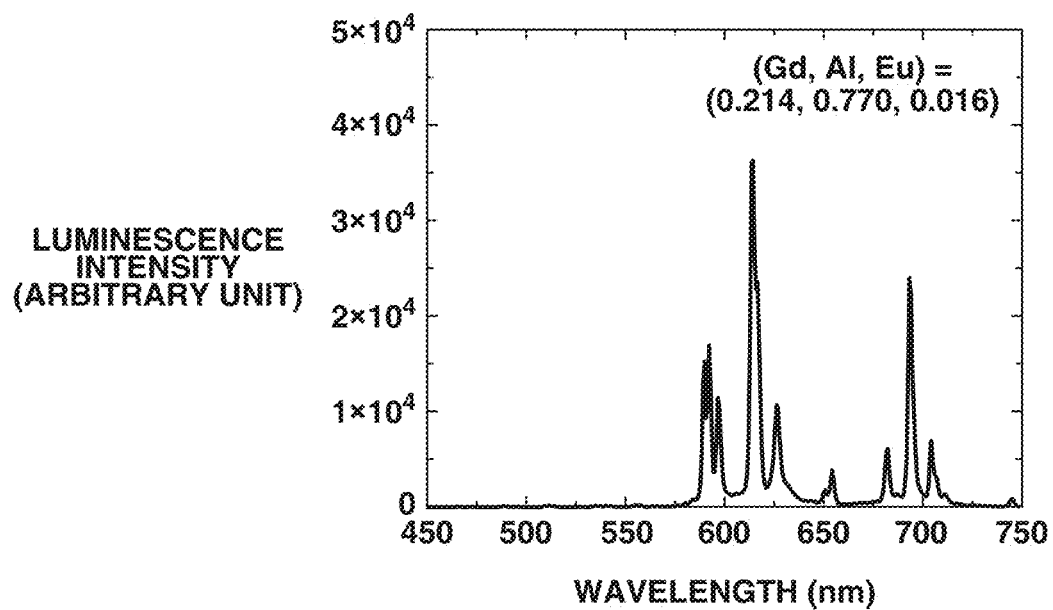
FIG. 5B illustrates an emission spectrum of the scintillator crystal excited by an X-ray in Example 3.

FIG. 5B illustrates the emission spectrum by the X-ray excitation. The first crystal phases forming the cylinders exhibited a sharp peak of red light emission from $Eu^{3+}$ functioning as the light emission center due to the f-f transition, and it was able to be confirmed that the resultant sample functioned as the scintillator. On the other hand, no light emission from $Al_2O_3$ serving as the second crystal phase was observed. Light emitted so as to satisfy the critical angle for the total reflection, in the light produced at the first crystal phases, is guided through the insides of the cylinders. On the other hand, light leaked to the matrix side without being totally reflected in the cylinders turns into light diffusing in the crystals while being refracted.

Figure 6B:
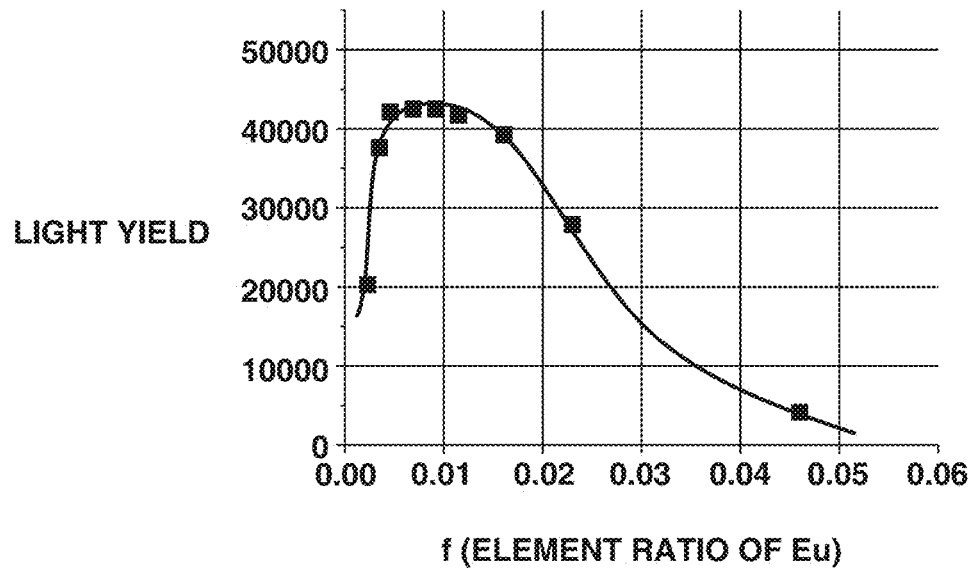
FIG. 6B illustrates a relationship between the quantity of Eu in the ratio and a light emission amount of the scintillator crystal in Example 3.

FIG. 6B illustrates a relationship between the quantity f of Eu in the ratio and the light yield (LY) value. When the quantity f of Eu in the element ratio was a range of f=0.005 to 0.012, the light emission amount was maximized and the LY value thereof was approximately 43,000. Assuming that the desirable composition range for functioning as the scintillator is the composition range that achieves LY=38, 500, which is the LY value corresponding to approximately 90% of the maximum LY value, or a larger LY value, a range of f=0.004 to 0.018 is a desirable range.

Figure 7B:
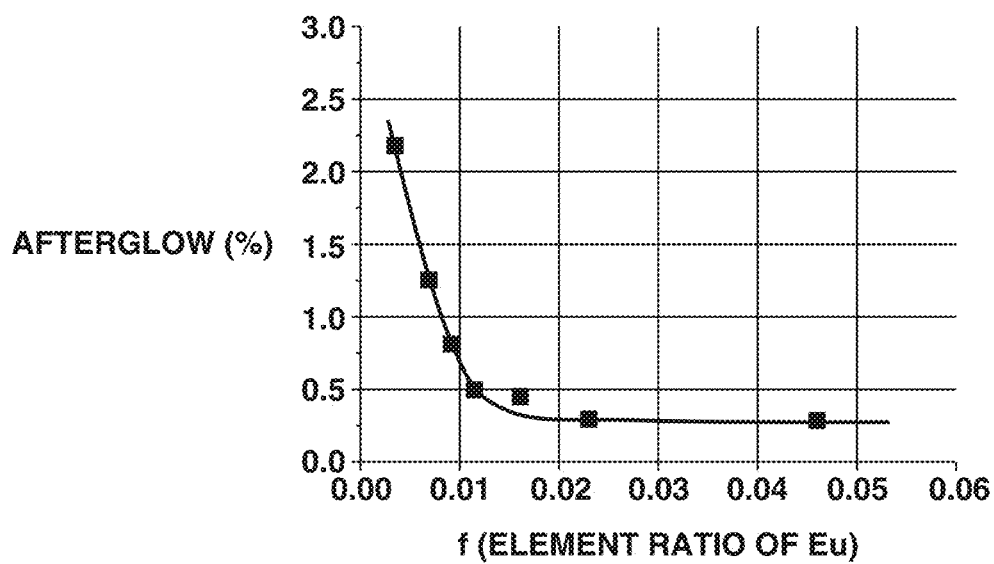
FIG. 7B illustrates a relationship between the quantity of Eu in the ratio and an afterglow of the scintillator crystal in Example 3.

In addition, it is desirable that the afterglow of the scintillator is little. FIG. 7B illustrates a relationship between the quantity f of Eu in the element ratio and a value of the afterglow level after 200 milliseconds. The afterglow reduced as the quantity f of Eu in the element ratio increased, and the afterglow level fell to 0.5% or lower when the quantity f of Eu in the element ratio increased to f=0.011 or higher.

This result has revealed that, when the sum of Gd and Eu and the quantity of Al in the element ratio are d+f=0.23 and e=0.77, respectively, the LY value can reach approximately 38,500 or larger if the quantity of Eu in the element ratio is 0.004≤f≤0.018. The element ratio (d, e, f) among Gd, Al, and Eu in this case is a composition within a range from B5:(0.226, 0.770, 0.004) to B6:(0.212, 0.770, 0.018) illustrated in FIG. 2B. Further, 0.011≤f≤0.018 is desirable, because this range enables the LY value to reach approximately 38,500 or larger and the afterglow level to fall to 0.5% or lower, which satisfies both the large light emission amount and the little afterglow. The element ratio (d, e, f) among Gd, Al, and Eu in this case is a composition within a range from B7:(0.219, 0.770, 0.011) to B6:(0.212, 0.770, 0.018) illustrated in FIG. 2B.

In this manner, it was able to be confirmed that it was possible to acquire the phase separation scintillator crystal capable of satisfying both the large light emission amount and the little afterglow according to the present exemplary embodiment, with use of the perovskite type oxide material containing both Gd and Eu as the first crystal phases and alumina ($Al_2O_3$) as the second crystal phase.

As described above, the composition ratio between the perovskite type oxide material and alumina may be another ratio as long as this ratio is within the range of ±5 mol % from 46:54. It is considered that an LY value similar to that of the sample having the composition within B6 to B5 can be acquired, as long as the composition ratio between the perovskite type oxide material and alumina is within this range, and the ratio between the perovskite type oxide material and Eu is (0.23−0.004):0.004 to (0.23−0.018):0.018. Further, it is considered that an LY value and an afterglow level similar to those of the sample having the composition within B6 to B7 can be acquired, as long as the ratio between the perovskite type oxide material and Eu is (0.23−0.011):0.011 to (0.23−0.018):0.018.

If the composition ratio between the perovskite type oxide material and alumina is 41:59 (mol %), the respective quantities in the element ratio can be expressed as (Gd, Al, Eu)=(0.205−f, 0.795, f). Since the sum of Gd and Eu is d+f=0.205, the quantities of Gd and Eu are d=0.201 and f=0.004, respectively, if the ratio therebetween is d:f=(0.23−0.004):0.004. On the other hand, if the ratio between Gd and Eu is d:f=(0.23−0.018):0.018, the quantities of Gd and Eu are d=0.189 and f=0.016, respectively. The element ratio (d, e, f) among Gd, Al, and Eu in this case is a composition within a range from B1:(0.189, 0.795, 0.016) to B4:(0.201, 0.795, 0.004) illustrated in FIG. 2B, and it is considered that an LY value similar to that in B6 to B5 can be acquired in this range. On the other hand, if the ratio between Gd and Eu is d:f=(0.23−0.011):0.011, the quantities of Gd and Eu are d=0.195 and f=0.010, respectively, and it is considered that an LY value and an afterglow level similar to those in B6 to B7 can be acquired in a composition range from B1:(0.189, 0.795, 0.016) to B8:(0.195, 0.795, 0.010).

If the composition ratio between the perovskite type oxide material and alumina is 51:49 (mol %), the sum of Gd and Eu is d+f=0.255, while Al is e=0.745. If the sum of Gd and Eu is d+f=0.255 while the ratio therebetween is d:f=(0.23–0.004):0.004, the quantities of Gd and Eu are d=0.250 and f=0.005, respectively. On the other hand, if the ratio between Gd and Eu is d:f=(0.23–0.018):0.018, the quantities of Gd and Eu are d=0.235 and f=0.020, respectively. The element ratio (d, e, f) among Gd, Al, and Eu in this case is a composition within a range from B2:(0.235, 0.745, 0.020) to B3:(0.250, 0.745, 0.005) illustrated in FIG. 2B, and it is considered that an LY value similar to that in B6 to B5 can be acquired in this range. On the other hand, if the ratio between Gd and Eu is d:f=(0.23–0.011):0.011, the quantities of Gd and Eu are d=0.242 and f=0.013, respectively, and it is considered that an LY value and an afterglow level similar to those in B6 to B7 can be acquired in a composition range from B2:(0.235, 0.745, 0.020) to B9:(0.242, 0.745, 0.013).

From the above-described analysis, it is considered that an LY value similar to that in B6 to B5 can be acquired if the element ratio among Gd, Al, and Eu is within the range defined by the above-described four vertexes B1, B2, B3, and B4. Further, it is further desirable that the element ratio among Gd, Al, and Eu is within the range defined by the above-described four vertexes B1, B2, B8, and B9, because it is considered that an LY value and an afterglow level similar to those in B6 to B7 can be acquired in this case.

Example 4 will be described as an example indicating a radiation detector using the scintillator crystal 19 manufactured in Example 1 and a result of imaging by this detector.

Figure 9:
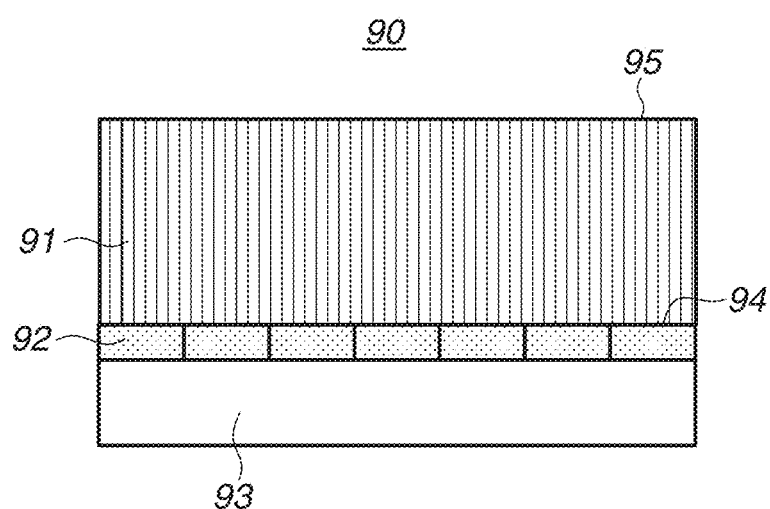
FIG. 9 is a schematic cross-sectional view of a radiation detector in Example 4.

FIG. 9 illustrates a schematic cross-sectional view of a radiation detector 90 according to the present exemplary embodiment. The scintillator crystal 19 manufactured in Example 1 of the present exemplary embodiment was cut into pieces each having the thickness of 1 mm, and was polished to be prepared as a sample. The radiation detector 90 was formed by mounting this scintillator crystal 19 on a photo detector 91 including a plurality of pixels 92 arranged in an array on a substrate 93, in such a manner that the columnar crystals were located generally perpendicularly opposite from the photo detector 91. The scintillator crystal 19 has the first surface 17 and the second surface 18 that are not located in a same plane as each other. The radiation detector 90 was formed by mounting the scintillator crystal 19 in such a manner that the first surface 17 was located opposite from the pixels 92 of the photo detector 91.

Figure 10:
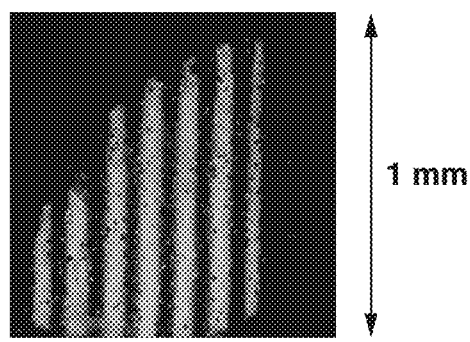
FIG. 10 illustrates a result of imaging a line test patter with use of the scintillator crystal in Example 1.

A tungsten light bulb was used as an X-ray source. Then, a line test pattern at 10 (line pair/mm), which was 50 μm in thickness and made from lead, was imaged with use of an X-ray acquired under conditions of 60 kV, 1 mA, and no Al filter used. The X-ray was applied in parallel with substantially central axes of the plurality of first phases of the above-described scintillator crystal 19. The measurement was carried out with use of a complementary metal-oxide semiconductor (CMOS) sensor having a pixel pitch of 5.2 μm as the photo detector 91. FIG. 10 illustrates a result of the imaging. The pattern at 10 (line pair/mm) was able to be clearly resolved, and assuming that a contrast transfer function (CTF) value thereof was defined as $CTF=(I_{max}-I_{min})/(I_{max}+I_{min})$ in which $(I_{max})$ and $(I_{min})$ represented a bright portion and a dark portion in a region where the lines were imaged, respectively, contrast as high as CTF=0.59 was able to be acquired.

For comparison purposes, a CsI needle crystal widely used as the scintillator for the radiation detector was evaluated in a similar manner, as a result of which the CTF value at 10 (line pair/mm) was 0.23 even with a thickness of 150 μm. Therefore, it was confirmed that the scintillator according to the present example was able to achieve the higher CTF value.

Although the exemplary embodiments of the present invention have been described, the present invention is not limited to these exemplary embodiments, and can be modified and changed in various manners within the scope of the gist of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-242448, filed Nov. 28, 2014, which is hereby incorporated by reference herein in its entirety.

What is claimed is:

1. A scintillator crystal comprising:
   a plurality of first crystal phases; and
   a second crystal phase covering respective side surfaces of the first crystal phases,
   wherein each of the plurality of first crystal phases is a columnar crystal that includes a perovskite type oxide material containing both Gd and Tb, and emits light by being excited by radiation,
   wherein the second crystal phase includes alumina, and
   wherein, assuming that a, b, and c respectively represent Gd, Al, and Tb in an element ratio among them that are contained in a total amount of substance of the scintillator crystal, the element ratio is within a range defined by (a, b, c)=(0.174, 0.795, 0.031), (0.207, 0.756, 0.037), (0.213, 0.775, 0.012), and (0.194, 0.795, 0.011) as vertexes in a ternary composition diagram.

2. The scintillator crystal according to claim 1, wherein $Ce^{3+}$ is added to each of the plurality of first crystal phases.

3. The scintillator crystal according to claim 2, wherein a concentration of the $Ce^{3+}$ is 0.001 mol % or higher to 1.0 mol % or lower with respect to the columnar crystal in each of the plurality of first crystal phases.

4. The scintillator crystal according to claim 1, wherein the scintillator crystal is a eutectic of the first crystal phases and the second crystal phase.

5. The scintillator crystal according to claim 1, wherein an average value of diameters of the plurality of columnar crystals is 300 nm or larger to 30 μm or smaller.

6. The scintillator crystal according to claim 1, wherein the plurality of first crystal phases is exposed at a first surface of the scintillator crystal and a second surface of the scintillator crystal that is different from the first surface.

7. The scintillator crystal according to claim 6, wherein the second surface is a surface opposite from the first surface.

8. A scintillator crystal comprising:
   a plurality of first crystal phases; and
   a second crystal phase covering respective side surfaces of the first crystal phases,
   wherein each of the plurality of first crystal phases is a columnar crystal that includes a perovskite type oxide material containing both Gd and Eu, and emits light by being excited by radiation,
   wherein the second crystal phase includes alumina, and
   wherein, assuming that d, e, f respectively represent Gd, Al, and Eu in an element ratio among them that are contained in a total amount of substance of the scintillator crystal, the element ratio is within a range defined by (d, e, f)=(0.189, 0.795, 0.016), (0.235, 0.745, 0.020), (0.250, 0.745, 0.005), and (0.201, 0.795, 0.004) as vertexes in a ternary composition diagram.

9. The scintillator crystal according to claim 8, wherein the scintillator crystal is a eutectic of the first crystal phases and the second crystal phase.

10. The scintillator crystal according to claim 8, wherein an average value of diameters of the plurality of columnar crystals is 300 nm or larger to 30 μm or smaller.

11. The scintillator crystal according to claim 8, wherein the plurality of first crystal phases is exposed at a first surface of the scintillator crystal and a second surface of the scintillator crystal that is different from the first surface.

12. The scintillator crystal according to claim 11, wherein the second surface is a surface opposite from the first surface.

13. A radiation detector comprising:
a photo detector; and
a scintillator crystal,
the scintillator crystal comprising
a plurality of first crystal phases, and
a second crystal phase covering respective side surfaces of the first crystal phases,
wherein each of the plurality of first crystal phases is a columnar crystal that includes a perovskite type oxide material containing both Gd and Tb, and emits light by being excited by radiation,
wherein the second crystal phase includes alumina,
wherein, assuming that a, b, and c respectively represent Gd, Al, and Tb in an element ratio among them that are contained in a total amount of substance of the scintillator crystal, the element ratio is within a range defined by (a, b, c)=(0.174, 0.795, 0.031), (0.207, 0.756, 0.037), (0.213, 0.775, 0.012), and (0.194, 0.795, 0.011) as vertexes in a ternary composition diagram,
wherein the plurality of first crystal phases is exposed, and
wherein the scintillator crystal is disposed in such a manner that a surface that intersects with two directions in which the plurality of first crystal phases is arrayed is located opposite from the photo detector.

* * * * *